Patented Nov. 17, 1931

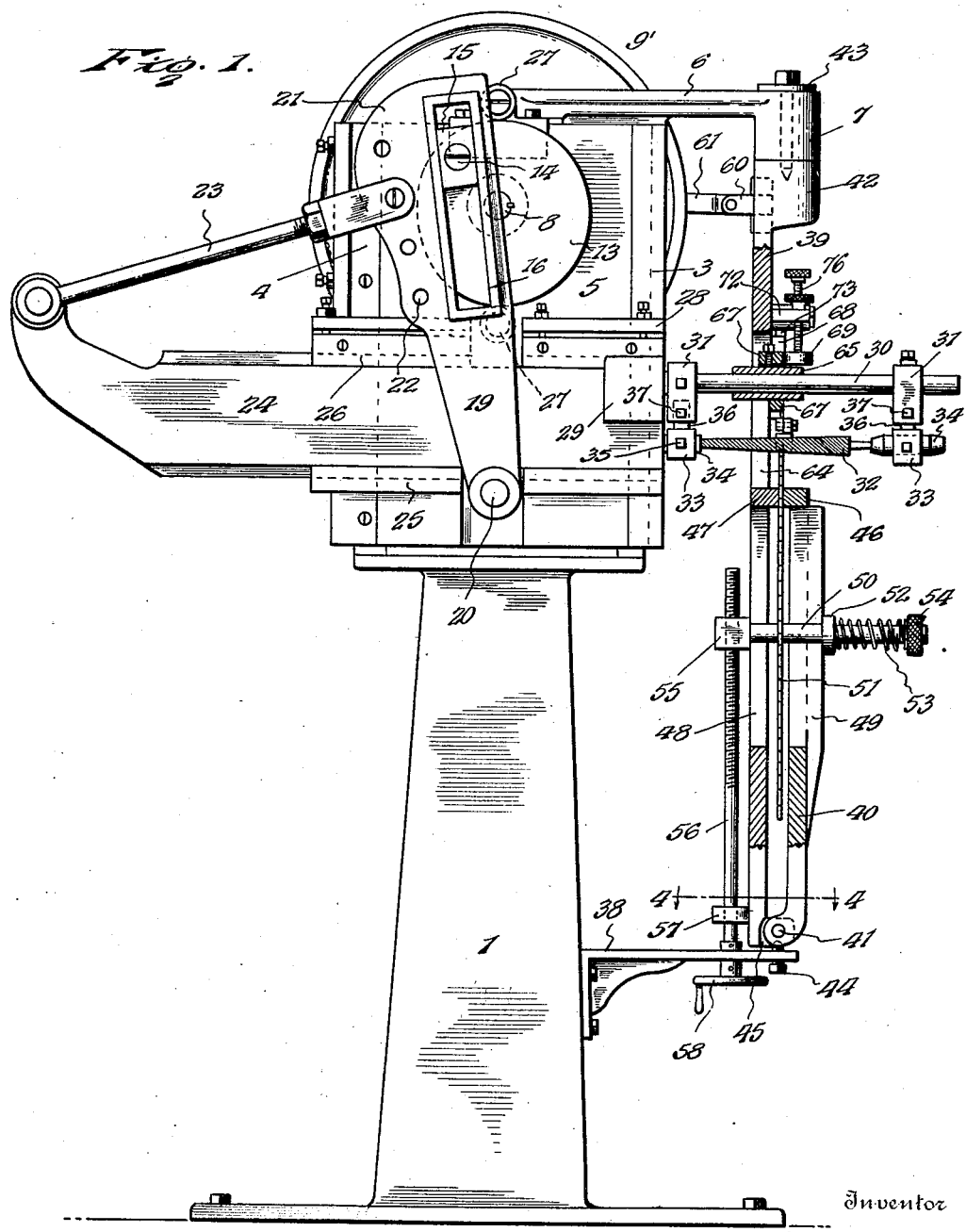

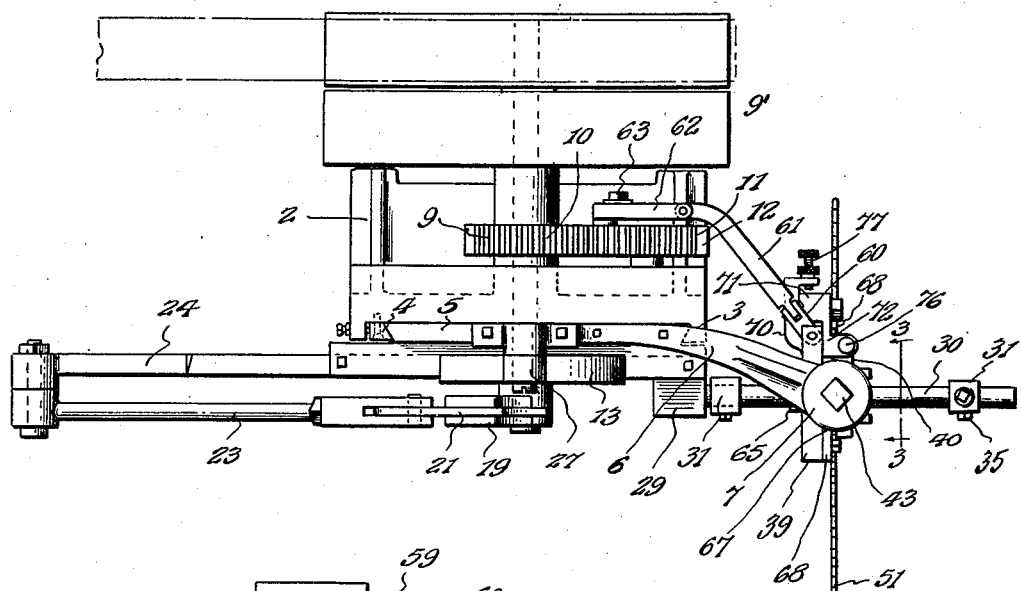
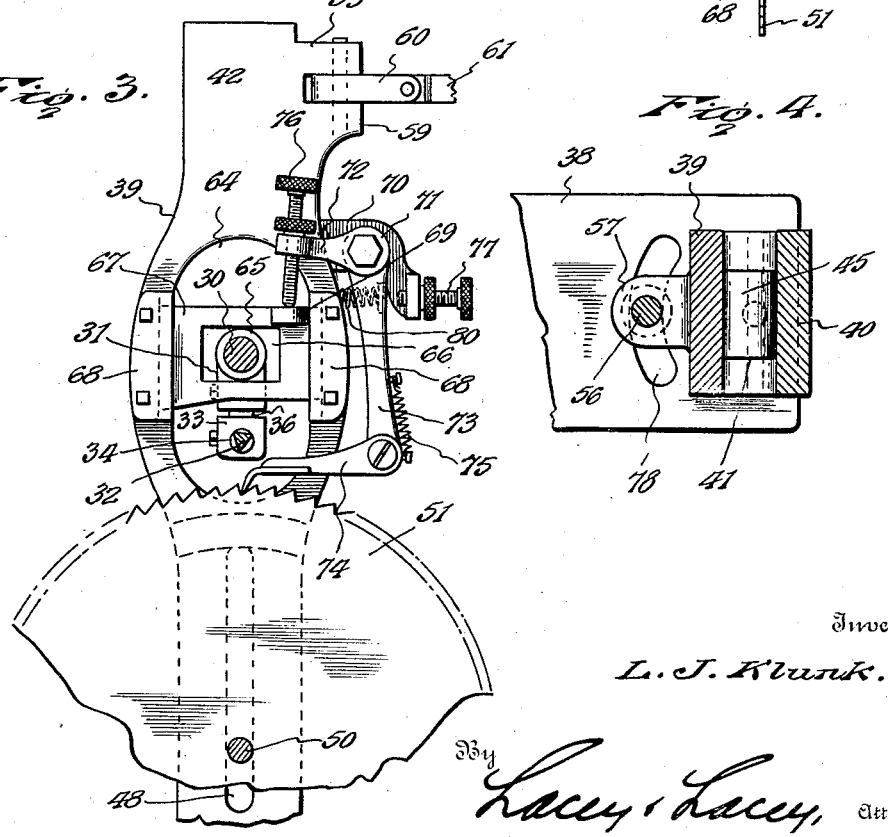

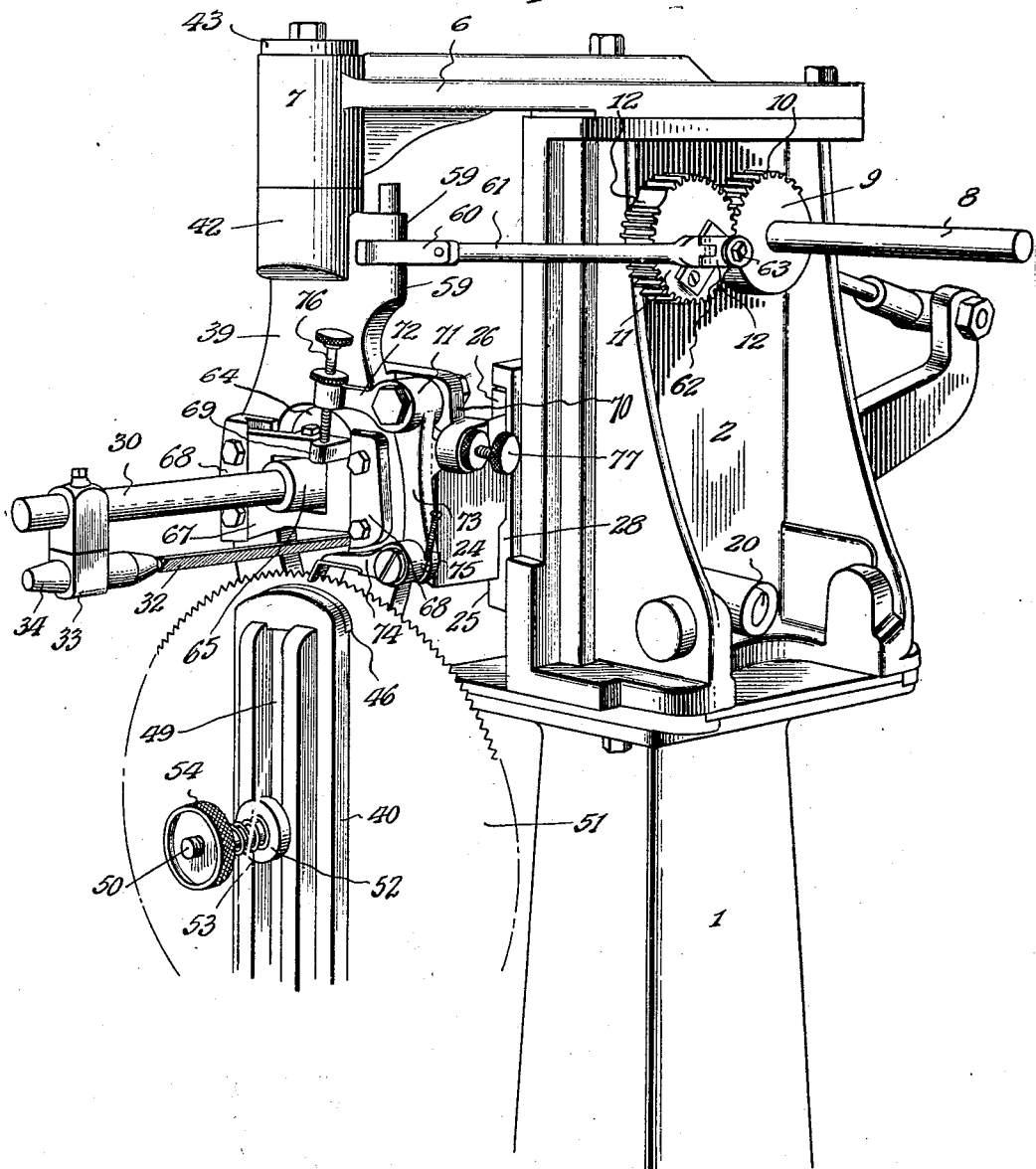

1,832,224

UNITED STATES PATENT OFFICE

LOUIS J. KLUNK, OF YORK, PENNSYLVANIA, ASSIGNOR TO BEAVER SAW FILING MACHINE CO., OF YORK, PENNSYLVANIA, A CORPORATION OF PENNSYLVANIA

SAW-FILING MACHINE

Application filed January 30, 1928. Serial No. 250,702.

This invention relates to machines for filing circular saws and has for its object the provision of a machine which will act automatically throughout the operation to reciprocate a file across the periphery of the saw so as to produce a bevel upon each saw tooth, to rock the saw about a vertical axis so that the opposite sides of a saw tooth will be presented alternately to the file and the proper bevels consequently produced, and to lift the file at intervals from the saw, and during those intervals to feed the saw step by step so as to present successive teeth to the file. The invention also has for its object the provision of means for accommodating saws of various diameters and to provide a novel driving mechanism whereby the proper sequence of actions will be attained. The invention also seeks generally to improve the construction and arrangement of the parts of a saw-filing machine to the end that the efficiency of the same may be increased and the operative life thereof prolonged. The invention is illustrated in the accompanying drawings and will be hereinafter fully set forth.

In the drawings:

Figure 1 is a front elevation, with parts in section, of a saw-filing machine embodying the present invention;

Fig. 2 is a top plan view of the same;

Fig. 3 is a detail section on the line 3—3 of Fig. 2;

Fig. 4 is a detail section on the line 4—4 of Fig. 1, and

Fig. 5 is an enlarged perspective view of the working parts of the machine as viewed from the rear.

In carrying out the invention, there is provided a pedestal 1 which may be rigidly secured in place within the work room in any approved manner. Upon the top of the pedestal 1 is secured a standard or back plate 2 suitably formed to possess the requisite strength and durability and provided upon its front face at its side edges with a stationary guide 3 and a horizontally adjustable guide 4 between which is mounted and held a slide 5. To the upper extremity of the back plate is secured a bearing arm 6 which projects laterally beyond the back plate and the pedestal and is provided at its free end with a bearing sleeve 7, as clearly shown. A driving shaft 8 is journaled through the back plate 2 near the upper end thereof and is shown as equipped with pulleys 9' of well-known form whereby motion may be imparted to the shaft from any convenient motor. Immediately adjacent the back face of the plate 2, a mutilated gear 9 is secured upon the driving shaft, said gear having one-half of its periphery blank and the other half provided with spur teeth, as shown at 10. Mounted upon a stub shaft carried by the plate 2 is a second mutilated gear 11 which has spur teeth formed upon its periphery throughout nearly the entire extent thereof but is provided with short blank spaces 12 at diametrically opposite points. By this arrangement it will be seen at once that the driving shaft may rotate continuously and during one-half of its rotation will impart motion to the gear 11, whereupon the blank portion of the gear 9 will be presented to one blank portion of the gear 11 and the latter gear will remain at rest. After the ensuing half revolution of the driving shaft, the toothed part of the gear 9 will again engage the gear 11 and impart another half revolution thereto. This action imparts the desired rocking motion to the saw and holds the saw stationary between the rocking movements so that the file may act upon the tooth presented thereto, all of which will presently more fully appear.

The front end of the driving shaft 8 is disposed in front of the slide 5 and the slide is formed with a vertical slot whereby it may move past the shaft, as will be understood. Fixed to the front end of the shaft immediately in front of the slide is a cam 13 carrying a wrist pin 14 journaled in a box 15 slidably mounted in a slot 16 formed in the upper portion of a lever 19 which is fulcrumed at its lower end upon the back plate, as indicated at 20. The lever 19 is formed with a lateral rib or wing 21 having a series of openings 22 therethrough, and pivotally attached to the lever at any one of said openings is a pitman 23 which extends laterally therefrom and has its outer end pivoted to the outer end of a horizontally reciprocating bar 24. Said bar 24 is mounted between guides 25 and 26 which are carried by the front face of the slide 5 so that the vertical movement of the slide will be transmitted to the guides and the bar 24 to lift the file from the saw at stated intervals. To positively operate the slide, rollers 27 are mounted thereon above and below the cam 13, as shown in Fig. 1. The guides 25 and 26 may be mounted upon the slide in any convenient manner, and I have indicated the lower guide as formed integral with a plate 28, which is secured to the slide, and the upper guide as adjustably carried by said plate.

At the end of the bar 24 remote from its pivotal connection with the pitman 23, there is formed thereon or secured thereto a block or bearing bracket 29 which receives the inner end of a bar 30 which forms a part of the file holder. Secured in any convenient manner upon the bar 30 are hangers or blocks 31 between the lower ends of which the file 32 is suspended, and it may be noted that the file may be mounted directly in the lower ends of these hangers, but I prefer to provide lower blocks 33 having sleeves 34 extended therethrough and secure the ends of the file in said sleeves, the sleeves being held against movement in the bearing blocks by set screws 35. Rising from the upper sides of these holding blocks 33 are studs 36 which enter sockets provided therefor in the lower ends of the hangers 31 and are secured therein by set screws 37 whereby the file holders may be readily adjusted to carry files of different sizes in proper relation to the saw which is to be sharpened.

A shelf 38 is secured upon one side of the pedestal 1 and disposed between this shelf and the bearing sleeve 7 and arm 6 is a vise or saw holder which consists of a relatively stationary jaw 39 and a relatively movable jaw 40, the jaws being hinged together at their lower ends, as indicated at 41. The upper extremity of the relatively stationary jaw 39 is provided with an offset 42 having a central recess or socket in its upper side to be engaged by a pivot member 43 inserted through the bearing sleeve 7 whereby the jaw 39 will be mounted for pivotal movement about a vertical axis, and, alined vertically with the pivot member 43, a centering pin or stud 44 is mounted through the shelf 38 to engage the hinge lug 45 of the stationary jaw. The movable jaw 40 is provided at its upper end with a gripping lip 46 mating with a similar lip 47 on the stationary jaw to engage opposite faces of the saw and thereby support the saw in proper position to be engaged by the file. The jaws are constructed with vertical slots 48 and 49, respectively, and a saw-supporting rod or bolt 50 is inserted through these slots to pass through the arbor opening of the saw and thereby support the saw, which is indicated at 51 in Fig. 1. The saw-supporting rod 50 is of circular cross section and is provided between its ends with a nut or abutment 52 which is adapted to bear against the outer face of the jaw 40 and is held thereto by a spring 53 mounted on the rod between said abutment and an adjusting nut 54 threaded on the outer end of the rod. At its inner end, the rod carries an eye 55 through which passes an adjusting screw or threaded rod 56 which is swiveled in the shelf 38 and rises therefrom to pass through the threaded eye or nut 55, as clearly shown in Fig. 1. The stationary jaw 39 is provided with a guide 57 adjacent its lower end through which the adjusting rod 56 passes and below the shelf a hand wheel or other form of handle 58 is secured upon the lower end of the rod. It will now be evident that by rotating the adjusting rod 56, the eye or nut 55 will be caused to travel upwardly or downwardly and the rod 50 consequently shifted vertically in the slots 48 and 49, thereby setting the rod to carry a saw of any desired diameter.

Pivotally mounted between lugs 59 on the rear edge of the jaw 39 at the upper extremity thereof is a link 60 to which is attached the outer end of a connecting rod 61 which is shaped to pass to the rear of the gear 11 and clear the same, as shown most clearly in Fig. 2, this connecting rod being connected with a link 62 which is carried by a wrist pin 63 on the gear 11, as shown most clearly in Figs. 2 and 5, and it may be noted that the connections of the connecting rod to the respective links provide for a universal movement so that the angular relations of the wrist pin and the lugs 59 will be accommodated without any undue strain upon any of the working parts. It will now be understood that the rotation of the gear 11 will be transmitted to the lugs 59 and thence to the relatively stationary jaw 39 so that the vise and the saw carried thereby will be rocked about an axial line passing through the center 44 and the pivot 43 to present the saw tooth at the proper angle to the file, the action being so timed that the saw will remain at rest during the movement of the file in one direction and will be then rocked to present the opposite face of the tooth to the file and will then remain at rest during the reverse movement of the file.

The main rod 30 of the file carrier passes through a vertical slot 64 in the jaw 39 above the gripping lip 47, and within this slot a sleeve 65 is secured upon the rod, said sleeve being fitted in an opening 66 in a slide 67 which is fitted at its vertical edges within guides 68 provided therefor on the outer side of the jaw, and said slide is provided at its upper rear corner with a lug 69, as shown. Extending rearwardly from the jaw 39 is a bracket 70 and pivotally mounted upon said bracket is an angle lever 71 having a short arm 72 projecting forwardly over the lug 69 and a long arm 73 extending downwardly at the rear of the jaw and the rear guide 68 thereon. Pivoted to the lower extremity of the arm 73 is a pawl 74 which extends forwardly therefrom, as shown clearly in Fig. 3, to engage the saw teeth, and a retractile spring 75 is attached to the lever and to the pawl so as to hold the pawl yieldably to the saw. Mounted in the end of the upper arm 72 is a set screw 76 which bears at its lower end upon the lug 69 so that the vertical movement of the slide 67 will be transmitted through the screw to the angle lever and the lever thereby rocked so as to cause the necessary reciprocation of the pawl. A set screw 77 is mounted in the rear extremity of the bracket 70 and is disposed in the path of the arm 73 to limit the rearward movement thereof and by properly adjusting the screws 76 and 77 the throw of the pawl may be nicely regulated so as to adjust the feeding action to the spacing of the saw teeth.

It will be noted that the saw is disposed in a vertical plane with the center stud 44 and the pivot 43 while the adjusting rod 56 is eccentric to such axis. Therefore, to accommodate the movement of the adjusting rod when the saw and the vise are rocked, I provide a slot 78 in the shelf 38, which slot is formed on an arc having the stud 44 for its center so that there will be no interference with the desired movement of the parts and bending or breaking of the adjusting rod 56 will be avoided.

It is thought the operation of the machine will be readily understood from the foregoing description, taken in connection with the accompanying drawings. The saw is secured in the vise, as shown and described, the parts being initially so arranged that the saw will be disposed at an oblique angle to the file and the file will be at one limit of its travel. The machine having been started, the file will be moved across the edge of the saw tooth presented thereto and will produce the desired bevel on one side thereof, and in the interval required for the reversing of the stroke of the file the saw and the vise are rocked so that the opposite face of the saw tooth will be presented to the file and upon the reverse stroke of the file the newly presented face of the tooth will be beveled. At the instant the file completes its reverse stroke, the slide 5 moves upwardly and this upward movement is of course, transmitted to the file holder through the bar 24 to which it is secured. The upward movement of the file holder is transmitted through the sleeve 65 and the slide 67 to the screw 76 so that, while the file is lifted from the saw, the angle lever 71 will be rocked and the pawl 74 caused to engage the saw tooth and feed the saw a distance equal to the space between two adjacent teeth. A return movement is then imparted to the file carrier and the slide 67 so that the file will be brought into position to act upon a second tooth and as the file moves downward the pawl will be retracted by the expansion of the spring 80 to engage a third tooth of the saw and be in position to repeat the feeding operation, the spring 80 being disposed between the jaw and the lever arm 73, as will be understood upon reference to Fig. 3. The saw is held firmly against the action of the file so that the sharpening of the tooth will be even and a smooth surface produced on the tooth but when the pawl applies feeding force directly to the saw, the spring 53 will permit the jaw 40 to yield sufficiently to permit the desired feeding movement of the saw without permitting it to get out of adjustment. The construction of the machine is simple and the arrangement of the parts compact while it operates in a highly efficient manner when in use.

Having thus described the invention, I claim:

1. In a saw-filing machine, the combination of a supporting frame, a vise mounted thereon for rocking movement about a vertical axis and including jaws hinged together at their lower ends and having vertical slots, a saw-supporting rod mounted through the slots in the jaws, means mounted on the frame and engaged with said supporting rod for vertically adjusting the same to accommodate saws of various diameters, yieldable means carried by said saw supporting rod for maintaining frictional engagement between the jaws of the vise and the saw, a file reciprocable through the upper portion of the vise in engagement with a saw tooth, and means for rotating the saw on said supporting rod between filing movements.

2. In a saw-filing machine, the combination of a supporting structure, a vise mounted on said structure for rocking movement about a vertical axis, means whereby the vise will support a saw in the vertical plane of said axis, a file movable transversely to the vise and the saw, a driving shaft near the upper end of the vise, a mutilated gear on said shaft having one-half of its periphery blank, a second gear arranged to mesh with the first-mentioned gear and having diametrically opposite short blank spaces on its periphery, a wrist pin on the second gear, a link carried by said wrist pin, a link pivoted to the upper end of the vise, and a connecting rod between and having universal connection with said links.

3. In a saw-filing machine, the combination of a supporting structure including a shelf having an arcuate slot, a vise, a stud in the shelf concentric with the slot therein pivotally supporting the lower end of the vise, a pivot element on the supporting structure alined vertically with the studs and engaged with the upper end of the vise, means for rocking the vise, a saw support passing transversely through the vise, and an adjusting rod swiveled in the shelf at the slot therein and engaged with the saw support.

4. In a saw-filing machine, a pedestal, upper and lower vertically alined pivot elements on the side of the pedestal, a relatively stationary jaw having its ends engaged with the respective pivot elements, said jaw having upper and lower vertically extending slots, a relatively movable jaw hinged at its lower end to the relatively stationary jaw immediately over the lower pivot element, said movable jaw also having a vertically extending slot, a rod engaged through the slot of the movable jaw and the lower slot of the stationary jaw to rotatably support a saw between the jaws, yieldable means mounted on said rod for causing the movable jaw to clamp the saw against the stationary jaw, a file extending through the upper slot in the stationary jaw to engage the saw, and means for reciprocating the file across the saw.

In testimony whereof I affix my signature.

LOUIS J. KLUNK. [L. S.]